Dec. 12, 1933.          C. S. MORT          1,939,311
REAR VISION REFLECTOR TUBE FOR MOTOR VEHICLES
Filed Jan. 15, 1932       4 Sheets-Sheet 1
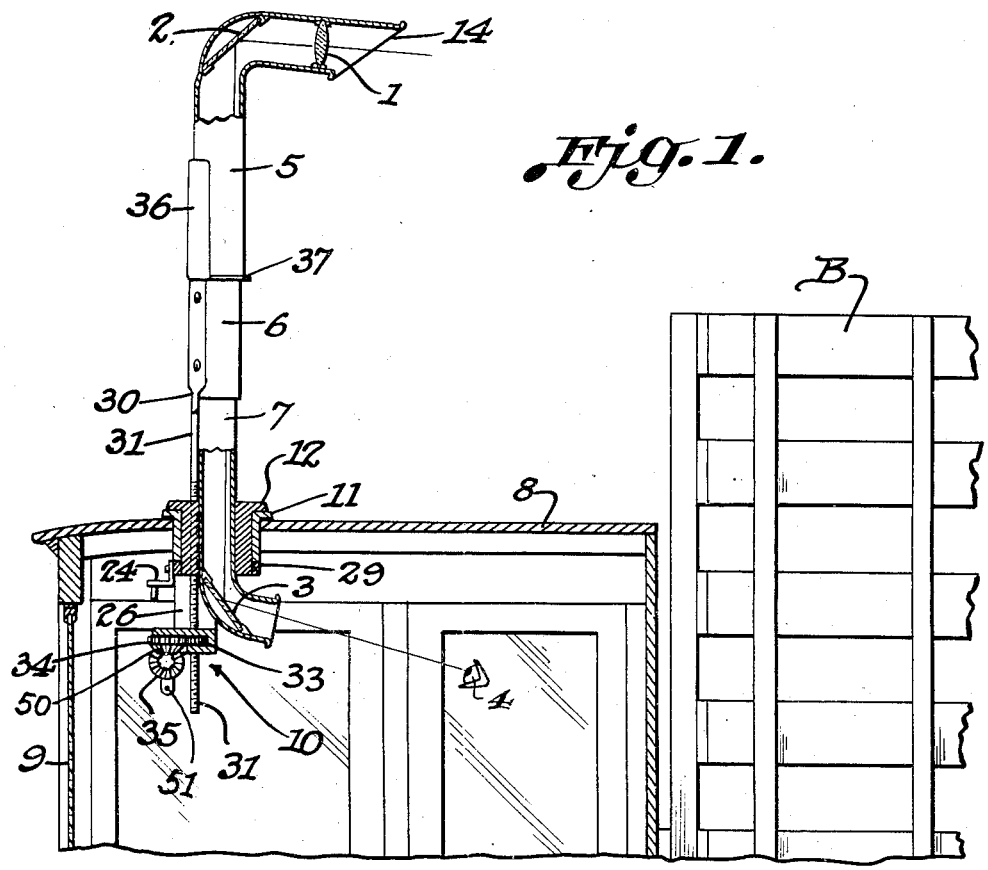
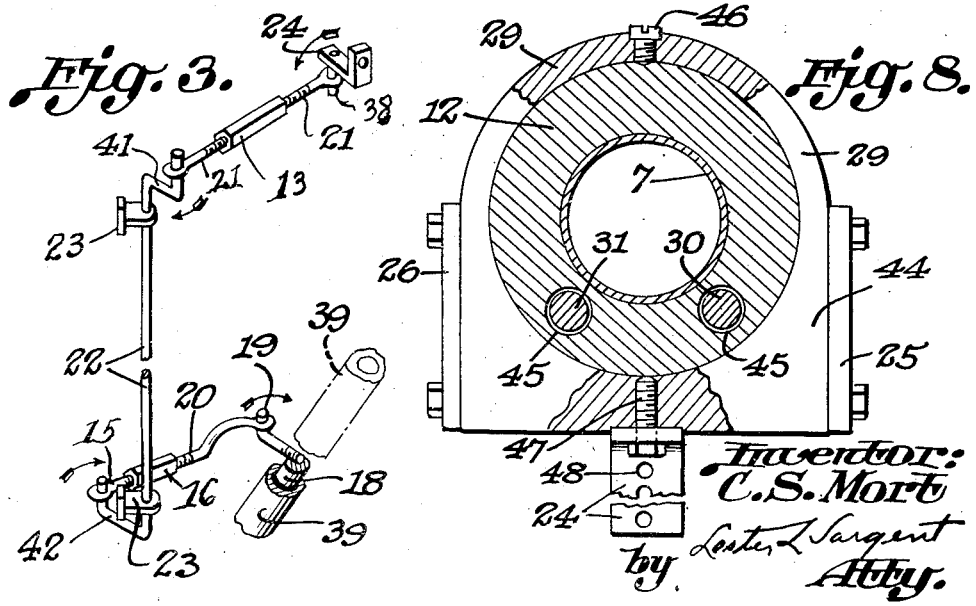

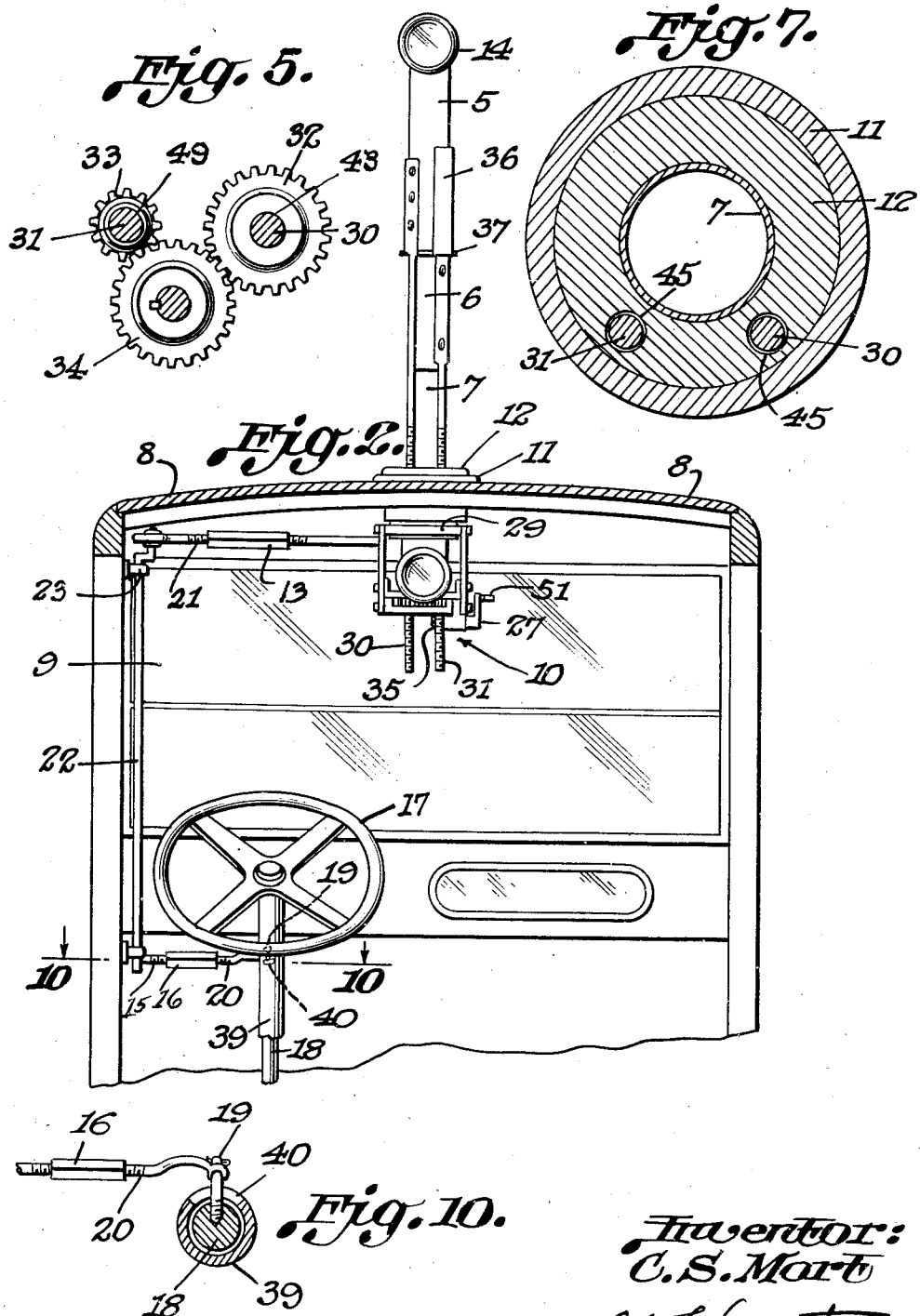

Dec. 12, 1933.  C. S. MORT  1,939,311
REAR VISION REFLECTOR TUBE FOR MOTOR VEHICLES
Filed Jan. 15, 1932  4 Sheets-Sheet 3
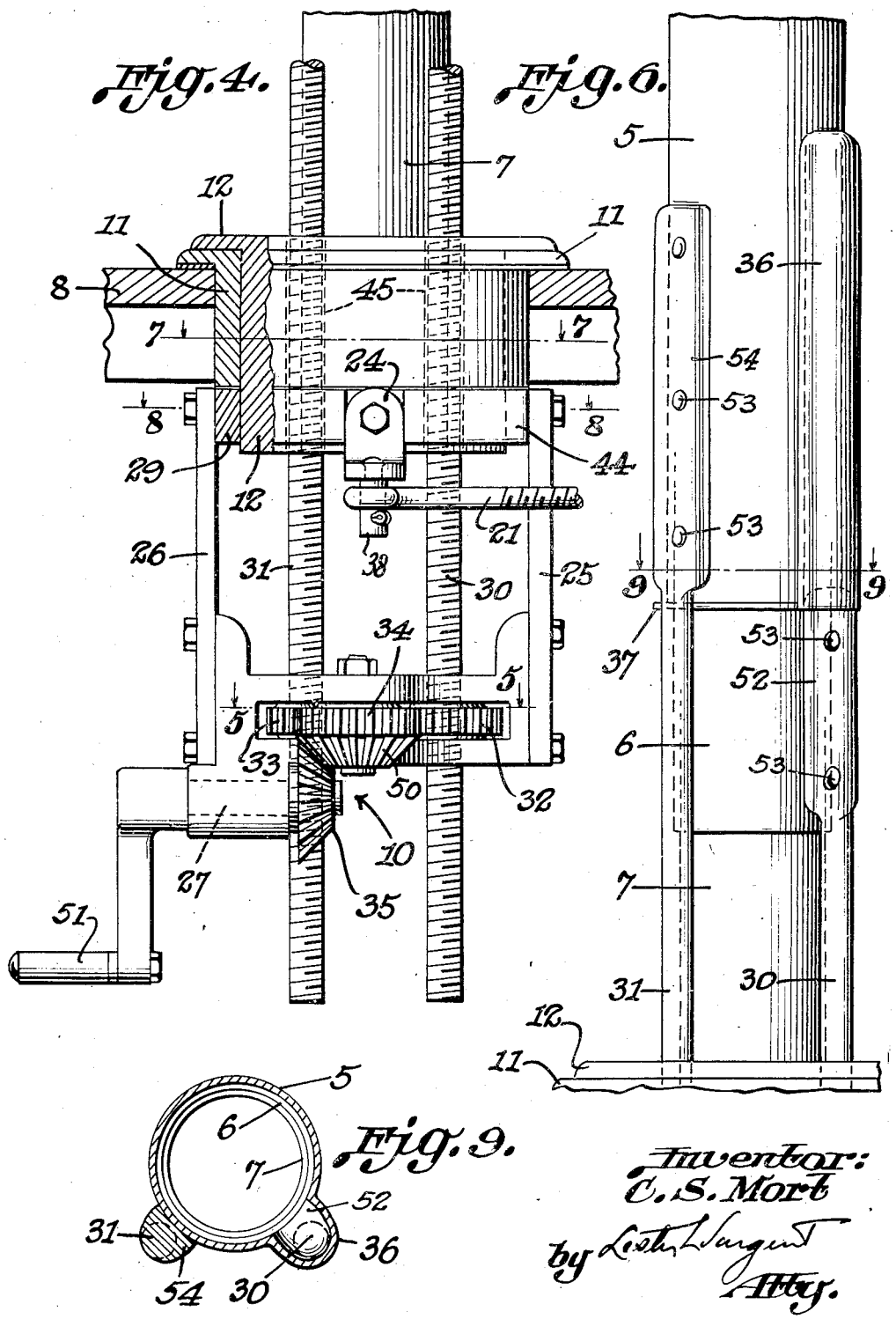

Dec. 12, 1933.  C. S. MORT  1,939,311
REAR VISION REFLECTOR TUBE FOR MOTOR VEHICLES
Filed Jan. 15, 1932  4 Sheets-Sheet 4

Inventor:
C. S. Mort
by Lester L. Sargent
Atty.

Patented Dec. 12, 1933

1,939,311

UNITED STATES PATENT OFFICE 1,939,311

REAR VISION REFLECTOR TUBE FOR MOTOR VEHICLES

Charles S. Mort, Nebraska City, Nebr., assignor of one-third to Leonard Seckman and one-third to Andrew P. Moran, both of Nebraska City, Nebr.

Application January 15, 1932. Serial No. 586,821

10 Claims. (Cl. 88—1)

The object of my invention is to provide a novel rear vision reflector for motor vehicles, especially for commercial motor trucks where the load is considerably wider and higher than the cab of the truck and which thus renders ordinary mirrors totally inadequate and impractical for affording rear vision. It is also an object of my invention to provide a device of the periscope type which will telescope under the control of the operator, to permit of entering garages and other buildings; to provide novel means for automatically turning the whole device slightly when driving on curves or a winding road so as to keep the road in the rear visible at all times; to provide a novel arrangement of the mirrors in the tube and to provide the novel combination and arrangement of parts disclosed in the accompanying drawings, in which—

Figure 1 is a longitudinal vertical section through a portion of the truck and through the reflector tube, a portion of the latter being shown in side elevation;

Fig. 2 is a transverse section through the cab of the motor truck, the reflector tube being shown in rear elevation;

Fig. 3 is a detail perspective view of the mechanism for linking the periscope with the steering post to automatically control the position of the upper end of the reflector tube;

Fig. 4 is an enlarged detail view partly in section and partly in elevation of the mechanism for telescoping the reflector tube;

Fig. 5 is a horizontal section on line 5—5 of Fig. 4;

Fig. 6 is a detail side elevational view of a portion of the reflector tube showing the telescoping mechanism;

Fig. 7 is a horizontal section on line 7—7 of Fig. 4;

Fig. 8 is a horizontal section on line 8—8 of Fig. 4;

Fig. 9 is a horizontal section on line 9—9 of Fig. 6;

Fig. 10 is a horizontal section on line 10—10 of Fig. 2;

Like characters of reference designate like parts in each of the several views.

Figure 11:
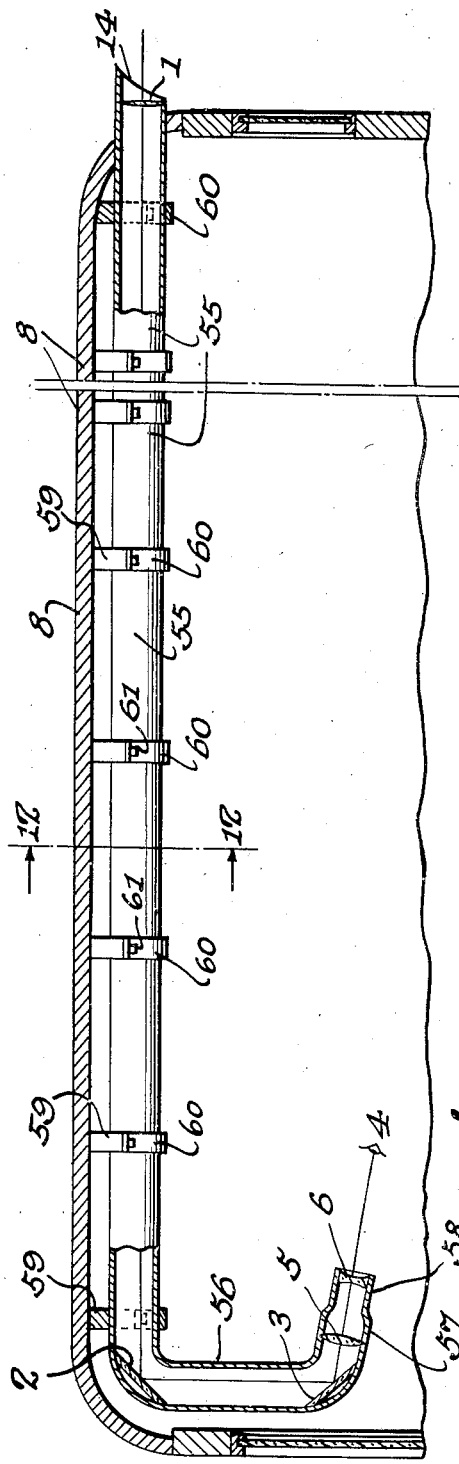
Fig. 11 is a longitudinal section through a motor bus or truck showing a modified form of the rear view reflector tube partly in longitudinal section and partly in side elevation.

Referring to the accompanying drawings, there is illustrated a motor truck B having the usual driver's cab, the roof of which is designated by the numeral 8 and the wind shield by the numeral 9. I provide a reflector tube comprising an upper angularly bent section 5, a straight intermediate section 6, and a lower angularly bent section 7, as shown in Fig. 1 of the drawings. In the upper section 5 I provide a lens 1 and slanting mirror 2. In the lower section 7 I provide an oppositely disposed slanting mirror 3. The eye of the observer or cab driver is diagrammatically indicated in Fig. 1 and designated 4. I provide mechanism for raising and lowering the telescoping reflector tube which is broadly designated as 10. Mounted in the roof 8 of the cab is a collar 11 in which is rotatably mounted a sleeve 12, said sleeve being affixed to the lower section 7 of the reflector tube.

The horizontal portion of the L-shaped tube section 5 terminates in the cowl 14 over the lens 1 to protect it from rain, snow, sun, etc., as shown in Fig. 1. Referring to Fig. 2 of the drawings, there is illustrated a conventional steering wheel 17 and steering post 18. I provide a screw or pin 19 secured to the steering post 18 and movable in the slot 40 of the steering post casing 39 as shown in Fig. 10. The curved end 20 of the lower turn buckle 16 is attached to screw or pin 19 while the straight end 15 is attached to the angularly bent end 42 of the vertical rod 22 which is mounted in suitable brackets 23 and which at its upper end has an angularly bent end or crank arm 41. Crank arm 41 is connected to one of the ends 21 of the upper turn buckle 13, the other end 21 being connected to the bracket connection 24. Bracket 24 is affixed by screw 47 to members 44 and 12 as shown in Fig. 8.

Referring to Fig. 4, I provide bars 25 and 26 bolted at their lower end to the gear carrying frame 27 and bolted at their upper end to the lugs or enlarged portion 44 of collar 29, as shown in Figs. 4 and 8.

I provide a threaded rod 30 having a flattened upper end 52 riveted to intermediate section 6. I also provide a similar threaded rod 31 having its flattened upper end 54 riveted to the upper tube section 5 by rivets 53, for the purpose of telescoping the tube. As shown in Figs. 4 and 5, I provide a gear 32 for actuating threaded rod 30, a smaller gear 33 for actuating threaded rod 31 at a more rapid rate than rod 30, and a third gear 34 for actuating both gears 32 and 33. Gear 34 is provided with a beveled gear portion 50 which meshes with the beveled gear 35, the latter gear being mounted on the crank arm 51.

As shown in Fig. 6, I provide a bead or cover element 36 on tube 5 to seat over the flattened end 52 of rod 30 when the tubes 5 and 6 are in telescoped position.

As shown in Figs. 1 and 2, I provide an annular flange 37 at the bottom of the upper tube section 5 to seat on the sleeve 12 when the tube is in lowered position.

Referring to Fig. 8, I provide apertures 45 in sleeve 12 through which the threaded rods 30 and 31 extend, and of larger diameter than rods 30 and 31, whereby the rods do not engage sleeve 12.

I provide a suitable set screw 46 in collar 29 opposite set screw 47 to securely affix the collar 29 to sleeve 12. Bracket 24 is provided with apertures 48 as shown in Fig. 8 to permit of adjustment of the pin 38 to which turn buckle member 21 is attached.

As shown in Fig. 5, gear 32 is provided with a threaded passage 43 to engage the threaded rod 30; and gear 33 is provided with a threaded passage 49 to engage the threaded rod 31.

In use, the driver by looking slightly upward and a little to the right is enabled to see in the lower mirror 3 an image or picture of the road behind his vehicle. The reflector tube may be telescoped by manually operating the crank 51 which turns gear 35 which in turn meshes with gear 50, and gear 34 in turn operates gears 32 and 33. As gear 33 is approximately half the size of gear 32, the upper tube section 5 to which it is operatively connected is lowered at twice the speed of the intermediate tube section 6 to which gear 32 is operatively connected. As the driver may lower the reflector tube at will he is enabled to watch the condition of his load without stopping or leaving the cab.

The mechanism shown in Figs. 2, 3, 8, and 10 operatively connects the steering post with the sleeve 12 which is affixed to the lower tube section 7 whereby the entire reflector tube is automatically turned slightly whenever the steering post is turned as when driving on curves or a winding road so that the road in the rear is kept visible through the reflector tube at all times.

The lens 1 is a bi-convex lens. Its effect is, first, to widen the field of vision; second, to apparently bring the objects in the field of vision closer to the observer in the cab; and, third, to invert the image which would otherwise be shown inverted to the eye of the observer. The rays of light from the image after passing through the lens 1 strike the upper mirror 2 and are reflected to strike the lower mirror 3 which reflects them to the eye of the observe 4.

Sections 5 and 6 of the reflector tube each telescope over the respective section below and are raised and lowered by the threaded rods 31 and 30 respectively, these threaded rods in turn being controlled by the gears 33 and 32 respectively which are manually controlled by the crank 51 and gear 35 as above described. When the reflector tube is completely lowered both the upper sections 5 and 6 will come to rest on the annular flange of sleeve 12, the bead 36 engaging over the flattened end 52 of threaded rod 30.

The metal collar 11 which is mounted in the roof 8 of the cab is fastened to the cab roof with a water tight joint. The annular flanged metal sleeve 12 which seats on it is rotatably mounted in the collar 11 but is securely affixed to the lower tube section 7.

The cowl 14 has its mouth slanted downwardly and rearwardly to protect the lens 1 from sunlight, rain and snow.

Figure 12:
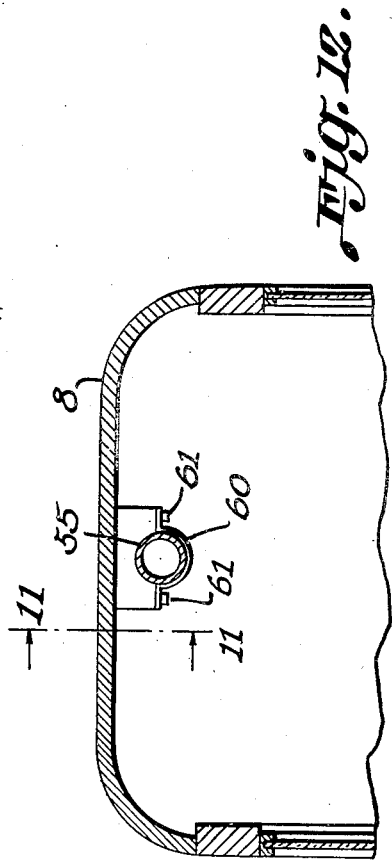
Fig. 12 is a vertical section on line 12—12 of Fig. 11.

Referring to Figs. 11 and 12, there is illustrated a modified form of my invention in which the reflector tube is shaped to extend under the roof of the bus or motor vehicle and have its cowl project at the rear in cases where it is not desirable to have the reflector tube project upwardly through the roof. As shown in Fig. 11 I provide a reflector tube 55 extending along the roof, with a vertical portion 56 and an inwardly turned end portion 57 and having the end 58 of slightly reduced size. I provide the lenses 5 and 6 in the lower end of the tube and the mirrors 3, 2, and lens 1 having the same functions as the correspondingly positioned elements in the form of the reflector tube shown in Figs. 1 to 10 inclusive.

I provide suitable brackets 59 and 60 and fastening member 61 for supporting the reflector tube to the roof of the motor bus.

It is within the contemplation of my invention, if desired, to run the reflector tube 55 just outside on top of the roof of the bus instead of inside as shown in Fig. 11.

What I claim is:—

1. In combination with a motor truck, a flanged collar mounted in the roof of the cab of the truck, a sleeve rotatably mounted in said collar, a reflector tube to which said sleeve is affixed, and means operatively connecting the steering post of the motor truck with the aforesaid rotatable sleeve to automatically turn same when the steering post is operated to keep the road in the rear visible to the driver when on a winding or curved road.

2. In combination with a motor truck, a flanged collar mounted in the roof of the cab of the truck, a sleeve rotatably mounted in said collar, a reflector tube to which said sleeve is affixed, and means operatively connecting the steering post of the motor truck with the aforesaid rotatable sleeve to automatically turn same when the steering post is operated to keep the road in the rear visible to the driver when on a winding or curved road, the aforesaid reflector tube comprising a series of telescoping sections, and means for telescoping said sections to alter the height of the upper end of the tube.

3. In composition with a motor truck, a flanged collar mounted in the roof of the cab of the truck, a sleeve rotatably mounted in said collar, a reflector tube to which said sleeve is affixed, and automatically operated means connecting the steering post of the motor truck with the aforesaid sleeve to turn same when the steering post is operated to keep the road in the rear visible to the driver when on a winding or curved road.

4. In a rear vision reflector tube for motor vehicles, the combination of a rear vision reflector tube mounted on the roof of the cab of a truck, said tube comprising an L-shaped upper section, a straight intermediate section and a substantially L-shaped lower section, mirrors mounted in the upper and lower sections to reflect the view at the rear of the automobile to the eye of the observer, and a bi-convex lens mounted in the upper section near the mouth thereof to invert the image and to widen the field of vision, means for lowering the upper tube section, separate means for lowering the intermediate tube section, mechanism operatively connected with both of said means for simultaneously operating same at different speeds whereby the upper and intermediate sections are lowered at appropriate speeds to bring them simultaneously down to the roof of the cab.

5. In a rear view reflector tube for motor vehicles, the combination of a reflector tube having a plurality of telescoping sections, the uppermost and lowermost sections being of L-shape, reflecting mirrors arranged at an angle in the uppermost and lowermost sections, a bi-convex lens mounted near the mouth of the upper section, the mouth of said uppermost section being slanted downwardly and rearwardly to form a protective cowl, and manually operated means for simultaneously raising or lowering the upper and intermediate telescoping sections of the reflector tube.

6. In a rear view reflector tube for motor vehicles, the combination of a reflector tube having a plurality of telescoping sections, the uppermost and lowermost sections being of L-shape, reflecting mirrors arranged at an angle in the uppermost and lowermost sections, a bi-convex lens mounted near the mouth of the upper section, the mouth of said uppermost section being slanted downwardly and rearwardly to form a protective cowl, and manually operated means for simultaneously raising or lowering the upper and intermediate telescoping sections of the reflector tube, means operatively connecting the steering post with the reflector tube for rotating the reflector tube when the steering post is rotated.

7. In a rear view reflector tube for motor vehicles, the combination of a reflector tube having a plurality of telescoping sections, the uppermost and lowermost sections being of L-shape, reflecting mirrors arranged at an angle in the uppermost and lowermost sections, a bi-convex lens mounted near the mouth of the upper section, the mouth of said uppermost section being slanted downwardly and rearwardly to form a protective cowl, and manually operated means for simultaneously raising or lowering the upper and intermediate telescoping sections of the reflector tube, means operatively connecting the steering post and reflector tube for automatically rotating the reflector tube when the steering post is rotated.

8. In a rear view reflector tube for motor trucks, the combination of a fixed collar mounted in the cab of the truck, a sleeve rotatably mounted in said collar, a rear view reflector tube mounted in and affixed to said sleeve, said reflector tube comprising lower and upper L-shaped sections and an intermediate section, the upper and lower sections having mirrors, a vertically extending bead formed on the upper section, threaded rods having flattened ends affixed to the upper and intermediate sections, the bead on the upper section being adapted to telescope over the flattened end of the threaded rod affixed to the intermediate section, gears having threaded passages in which these threaded rods are mounted, the gear in operative engagement with the threaded rod to the upper section being half the size of the gear connected with the threaded rod to the intermediate section, a third gear meshing with both of said gears to operate same at different speeds, and means for actuating the third gear whereby to lower the upper and intermediate sections to the roof of the cab at different speeds and simultaneously.

9. In combination with the apparatus defined in claim 8, a rotatable collar affixed to the lower section of the reflector tube, means operatively connecting said collar to the steering post of the motor truck and adapted to rotate the reflector tube when the steering post is turned.

10. In combination with the apparatus defined in claim 8, a rotatable collar affixed to the lower section of the reflector tube, means operatively connecting said collar to the steering post of the motor truck and adapted to rotate the reflector tube when the steering post is turned, the aforesaid means including turn buckles for adjusting said means to the dimensions of the particular truck to which it is applied.

CHARLES S. MORT.